United States Patent [19]

Viaud et al.

[11] 4,386,561
[45] Jun. 7, 1983

[54] TYING DEVICE FOR CYLINDRICAL-BALE-FORMING BALER

[75] Inventors: Jean Viaud; Jean P. Berthet, both of Gray, France

[73] Assignee: Deere & Company, Moline, Ill.

[21] Appl. No.: 264,747

[22] Filed: May 18, 1981

[30] Foreign Application Priority Data

May 29, 1980 [FR] France ................................ 80 11920

[51] Int. Cl.³ .............................................. B65B 13/02
[52] U.S. Cl. .......................................... 100/5; 100/13
[58] Field of Search .................. 100/5, 13, 88; 56/341

[56] References Cited

U.S. PATENT DOCUMENTS 3,894,484 7/1975 Anstey et al. ............................ 100/5
3,913,473 10/1975 Meiers ..................................... 100/5
4,133,258 1/1979 Popiolek et al. ........................ 100/5
4,150,527 4/1979 Meiers ................................... 56/341
4,240,339 12/1980 Simonis .................................. 100/5

FOREIGN PATENT DOCUMENTS 2749611 5/1979 Fed. Rep. of Germany .......... 100/5
2800800 7/1979 Fed. Rep. of Germany .......... 100/5

*Primary Examiner*—Billy J. Wilhite

[57] ABSTRACT

A tying mechanism for a cylindrical baler is comprised of a twine guide movable across the baler chamber throat on a screw. The guide includes a pulley mounted on a screw such that the pulling of twine through the guide rotates the pulley and moves it across the chamber throat.

9 Claims, 6 Drawing Figures

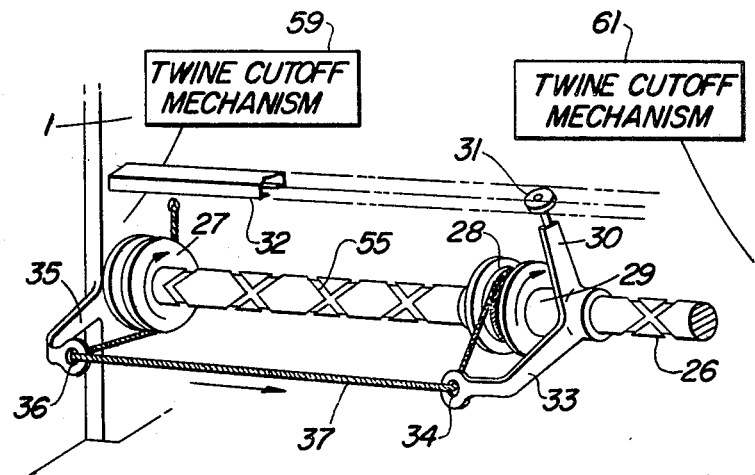
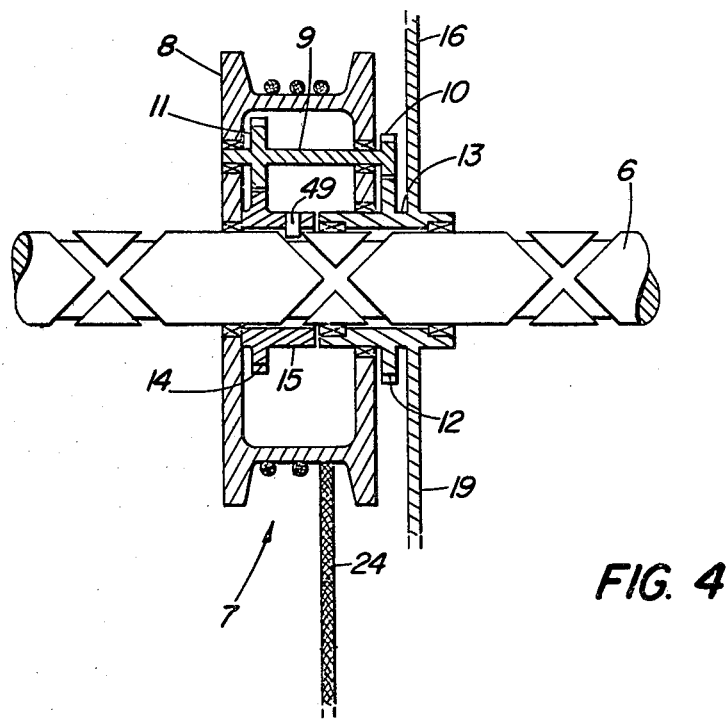
FIG. 5
FIG. 4

TYING DEVICE FOR CYLINDRICAL-BALE-FORMING BALER

BACKGROUND OF THE INVENTION

The present invention is related to a baler for forming cylindrical bales and more particularly to a mechanism for tying such bales in the baler at the end of the bale formation.

Balers of this type are well known and comprise generally sets of bands, chains, or belts which, by their displacement, form, by winding inside a chamber provided in the body of the baler, a bale of generally cylindrical shape from harvested products, particularly forage or hay, collected on the ground during the advance of the baler through a field. Such bales are typically tied prior to discharge from the baler.

This operation, which is carried out with the aid of a tying material usually constituted by a length of twine, may be effected in known manner by means of a twine guide which is displaceable transversely of the direction of travel of the baler in front of the entrance for harvested products into the bale-forming chamber. The twine is withdrawn from a supply, such as a twine box, provided on the chassis or body of the baler. As a result of the transverse displacement of the twine guide, the twine, when it is pulled out by the rotation of the bale, forms helical turns around the bale and ensures the entire length of the bale is tied.

It is known (e.g., U.S. Pat. No. 3,913,473) to make the guide member for the twine in the form of an arm, especially in the form of a tubular arm, which is pivotably mounted on the baler in such a manner as to produce, under the action of suitable means, a transverse movement opposite the opening for the entry of the harvested products into the bale-forming chamber.

It is also known to have a twine guide which is displaced along a rectilinear guide arranged in front of the entrance of the harvested products into the bale-forming chamber. Means are then provided to bring about in a positive manner the displacement of the twine guide along the rectilinear guide. According to a known construction (German Patent Application No. 26 45 762), an electric motor is used to rotate a screw which is mounted in the twine guide by a guide member, similar to a carriage, with an element engaging the screw thread and enabling the twine guide to be displaced on the rectilinear guide. Electrical contacts are provided for enabling the appropriate displacements to be obtained. It will be understood nevertheless that an electric motor and electrical contacts, are scarcely compatible with the operational conditions of a baler and that harvested products can, for example, impede the operation of the electrical contacts and thus disturb the tying operation.

An object of the invention is to remedy the drawbacks of the existing constructions and to provide a device having a rectilinear guide in which the withdrawal of the twine by the bale automatically brings about the displacement of a twine guide along the a rectilinear guide.

SUMMARY OF THE INVENTION

These and other objects of the invention which will be apparent from a review of the following detailed description and accompanying claims are accomplished by tying device for cylindrical-bale-forming baler. The tying device includes a rectilinear guide constituted by a screw and a twine guide means comprised of a pulley over which passes the twine that is used for binding the bale. The pulley is disposed in the twine path intermediate the twine supply and the chamber containing the bale. The pulley has a hub engaged with the screw in such a manner that the pull exerted on the twine by the bale during the bale's rotation in said chamber brings about the rotation of the pulley and hence its displacement on the transverse rectilinear guide due to the engagement of the pulley hub with the screw.

There is thus obtained an extremely simple mechanical construction of the device, which reduces the possibility of malfunction, since the displacement of the twine guide along the rectilinear guide is ensured by the actual pull of the twine produced by the rotating bale.

In order to ensure the rotation of the pulley forming the twine guide, the twine preferably forms at least one turn around the pulley.

Since the guide pulley for the twine should be capable of being displaced to and fro between the two sides of the press, the screw which forms the rectilinear guide preferably has a reversible or double screw thread.

According to one preferred embodiment, the transverse rectilinear guide is constituted by a stationary screw and the twine guide means is comprised of a single pulley which pulley comprises an outer rim, an inner hub engaged with the screw, and an epicyclic gear train interposed therebetween. It is thus possible to obtain between the said rim and the said inner hub a suitable reduction in the speed of rotation, which enables use to be made of a screw having a relatively large pitch while nevertheless producing a sufficiently slow displacement of the twine guide in the transverse direction opposite the entrance for the harvested products into the baler. It can indeed by appreciated that, having regard to the considerable diameter of the cylindrical bales formed in such balers, the rate of withdrawal of the twine is high. It is therefore necessary, in such a case, to provide means which take into account the resulting high rotational speed of the pulley forming the twine guide and produce a sufficiently slow movement of this pulley transverse of the bale chamber opening. With this design there is no need to utilize a screw having a fine pitch screw thread, which would obviously be expensive, particularly due to the fact that it must be reversible.

Also with this arrangement, the twine guide pulley is movable in the two directions of displacement on the rectilinear guide screw and preferably a twine cutoff mechanism is provided for severing the twine on each side of the baler.

According to a second embodiment, the rectilinear guide is constituted by a screw journalled in bearings provided on the baler. The twine guide means is comprised of a pair of pulleys. The first pulley of the pair is mounted on and keyed to one end of the screw. The second pulley of the pair has a hub engaged with the threads of the screw so as to be movable back and forth along the screw when the screw is rotated. The path of the twine is from the twine supply to the first pulley and then to the second pulley and lastly to the bale for tying. The winding diameter of the first pulley is less than the second pulley. The relative diameters of the pulley are chosen such that the second pulley undergoes a slow displacement on the screw during the tying of a bale.

BRIEF DESCRIPTION ON THE DRAWINGS

The following description, made with reference to the annexed drawings and not given by way of limitation, will enable the invention to be better understood.

FIGS. 3 and 4 are more detailed views on a larger scale, partly broken away, showing the internal arrangement of the pulley of the twine guide means according to the embodiment of FIGS. 1 and 2.

FIG. 5 is a fragmentary view of a second embodiment of a tying device in accordance with the invention.

DETAILED DESCRIPTION OF THE PREFERRED EMBODIMENTS

Reference is now made to FIGS. 1-4 which show a first preferred embodiment of a tying device in accordance with this invention.

Figure 1:
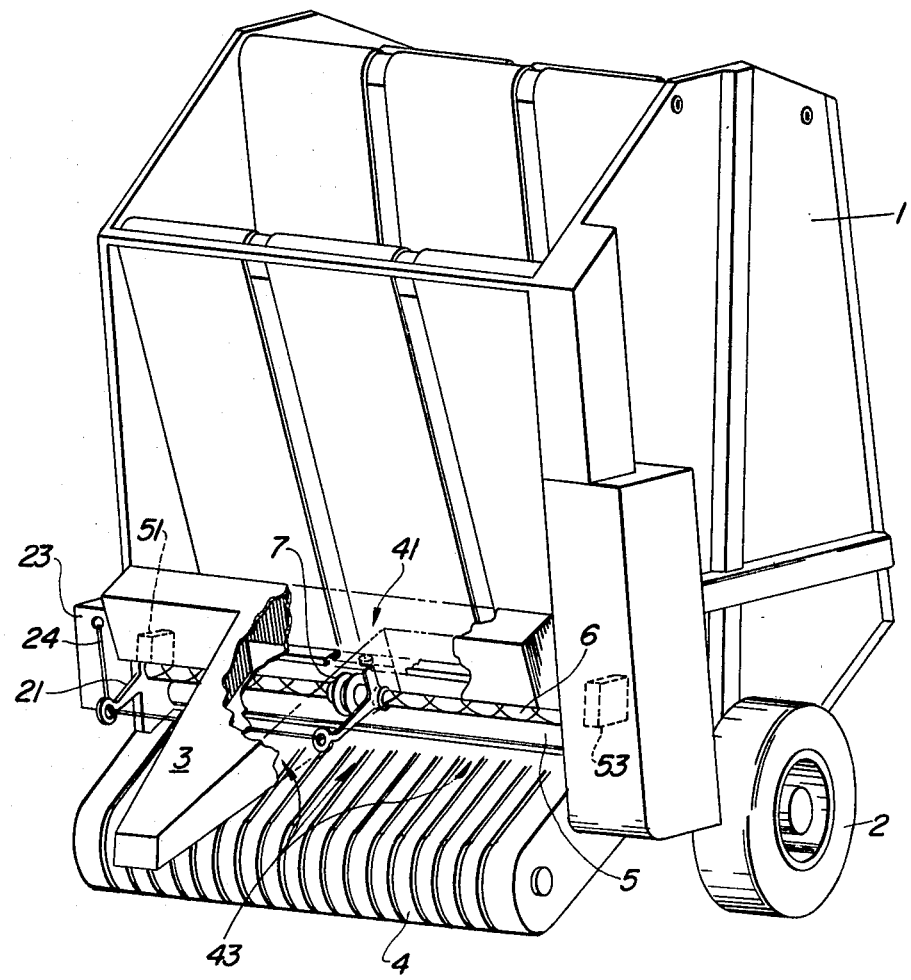
FIG. 1 is a perspective view of a cylindrical-bale-forming baler provided with a tying device according to the invention.

In FIG. 1 there is shown a cylindrical-bale-forming baler of conventional type except for a tying device 41. The baler may be, for example, of the same general type as shown and described in U.S. Pat. No. 4,150,527, the disclosure of which is hereby incorporated by reference herein. The baler comprises a body 1 supported by a chassis provided with wheels 2 (only one being shown). The baler is intended to be towed by a tractor by means of a tow bar 3. A pick-up 4 is provided in a conventional manner on the front part of the body 1 of the baler to collect the harvested product, such as hay and forage from the ground and convey it into an entrance 43 in the baler, which is provided between a pair of compression rollers 5, (one of which is visible in FIG. 1). The product is subjected in the interior of the chamber of the baler to a rolling-up operation under the action of bands or belts so as to form a cylindrical bale in a well known manner.

Figure 2:
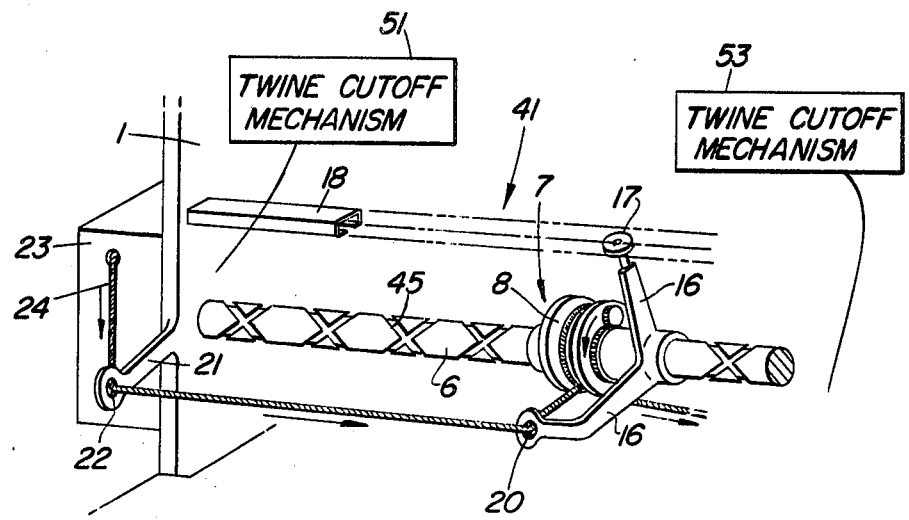
FIG. 2 is an enlarged, fragmentary view of the tying device shown in FIG. 1.
Figure 3:
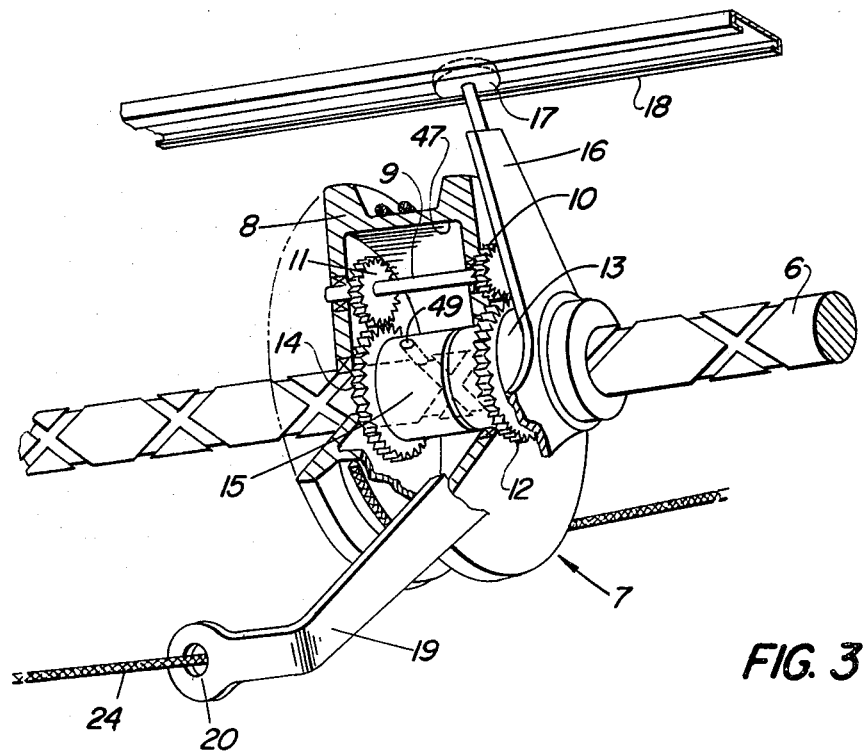

According to the preferred embodiment of this invention and in reference to FIGS. 2-4, tying device 41 includes a rectilinear guide here constituted by a stationary screw 6 with a double (helical) or reversible screw thread 45. Screw 6 is arranged transversely of the baler slightly in advance of and parallel to the entrance 43. Tying device 41 further includes a twine guide means here constituted by a pulley 7. Pulley 7 has a grooved outer rim 8 provided with an interior cavity 47. In the side walls of cavity 47, a shaft 9 carrying two pinions or planet gears 10, 11 is journalled. Pinion 10 meshes with a set of gear teeth 12 carried by a nonrotatable hub section 13 and forms a first planetary member. Pinion 11 meshes with a second set of gear teeth 14 having a diameter different from that of the gear teeth 12 and carried by a rotatable hub section 15. The interior of hub section 15 is provided with a pin 49 or like shaped part which is in engagement with the screw threads 45 of the stationary screw 6. It is thus apparent that the pulley 7 has within it an epicyclic gear train, the function of which will be indicated later.

The nonrotatable hub section 13 carries a first arm 16 which extends upwardly and is provided at its extremity with a roller 17. Roller 17 is engaged in a guide channel 18 formed, for example, by a member fixed to the baler and having a "U" shape cross section. Channel 18 extends transversely to the baler and parallel to the screw 6. Thus, during transverse movement of the pulley 7 on the screw 6, the hub section 13 is prevented from rotating by engagement of the roller 17, carried by the arm 16, in guiding and retaining channel 18. Hub section 13 also carries a second arm 19 which, in the embodiment shown in FIGS. 1 to 4, extends forwardly and which terminates in an eyelet 20.

An arm 21 carried by a side wall of the baler is provided likewise at its free end with an eyelet 22. A twine supply or box 23 is located in the vicinity of this arm 21. Twine 24 issuing from the twine box 23 passes initially through the eyelet 22 of the arm 21 and then through the eyelet 20 of the arm 19. From eyelet 20, twine 24 is wound on the pulley 7 and has its end directed towards baler entrance 43.

Tying device 41 further includes a pair of conventional twine cutoff mechanisms 51, 53 provided respectively at each end of screw and actuable (1) to sever twine 24 at the end of a bale tying cycle (2) to retain the twine end disposed therein until the initiation of the next tying cycle and (3) to release the twine end upon initiation of the next tying cycle. The twine severing and retention operations of each cut-off mechanism 51, 53 may be controlled automatically by mechanical engagement with arm 16 as pulley 7 moves to the respective end of screw 6 adjacent each cut-off mechanism 51, 53. The twine release operation of the cut-off mechanism 51, 53 may be automatically or manually controlled upon the completion of the formation of a bale in the bale-forming chamber through conventional means (not shown). Manual control may be accomplished, for example, via a remote controlled solenoid actuator for each respective cut-off mechanism 51, 53. Cut-off mechanisms 51, 53 form no part of the invention herein and accordingly will not be described in detail herein. An exemplary twine cut-off mechanism which may be used with the invention herein is disclosed in U.S. Pat. No. 3,894,484, col. 5, line 19 et seq., the disclosure of which is hereby incorporated by reference herein.

The manner of operation of this embodiment of the invention is as follows:

In a manner known per se (see e.g. U.S. Pat. No. 3,894,484), at the beginning of the operation, the free end of twine 24 is held by the respective one of the cutoff mechanisms 51, 53, which severs twine 24 at the end of the tying operation for the previous bale. Pulley 7 is located at that end of the screw 6 which is close to the respective one of the cut-off mechanisms 51, 53 holding the end of twine 24.

When the formation of the bale is substantially finished, conventional means (not shown) bring about the release of the twine from the cutoff mechanism, so that the end of the twine hangs down freely and can be picked up by the harvested products and by the bale. The bale draws twine 24 along with it by its rotary movement, while applying traction thereto.

The traction produced by the pulling action of the twine, assuming that twine surrounds the outer rim 8 of the pulley 7, causes rotation of outer rim 8. Rotation of rim 8 causes pinion 10 to roll on nonrotatable gear teeth 12. As a result, rotational drive is transmitted to the pinion 11 and hence to gear teeth 14 and to the inner hub 15, with a relatively low angular speed. The angular speed is a function of the difference between the diameters of the gear teeth 12, 14. By engagement with the screw-threads 45 of the screw 6, rotary hub 15 produces a slow displacement of the pulley 7 along screw 6. As pulley 7 is displaced along screw 6, roller 17 is rolled along in channel 18 which serves to prevent rotation of outer hub 13 and to guide movement of pulley 7.

Thus, the twine pulled out by the bale produces, by the intermediary of the epicyclic gear train of the pulley 7, the required slow transverse movement along the screw 6, opposite the baler chamber entrance 43 so that the binding of the bale is effected helically in the desired manner. The twine is withdrawn progressively in the course of the tying operation from the twine box 23 via the eyelets 20 and 22.

When the pulley 7 has reached that end of the screw 6 which is remote from its starting position, arm 16 actuates the adjacent cut-off mechanism so that it severs the twine and holds the free end thereof. All pull on the twine then ceases and the pulley 7 comes to rest in its new starting position, while the bound bale can be discharged from the press.

During the next binding operation the pulley 7 will of course be displaced in the opposite direction along the screw 6, provided that screw 6 has a double screw-thread, at a reduced speed of traverse as before.

Figure 6:
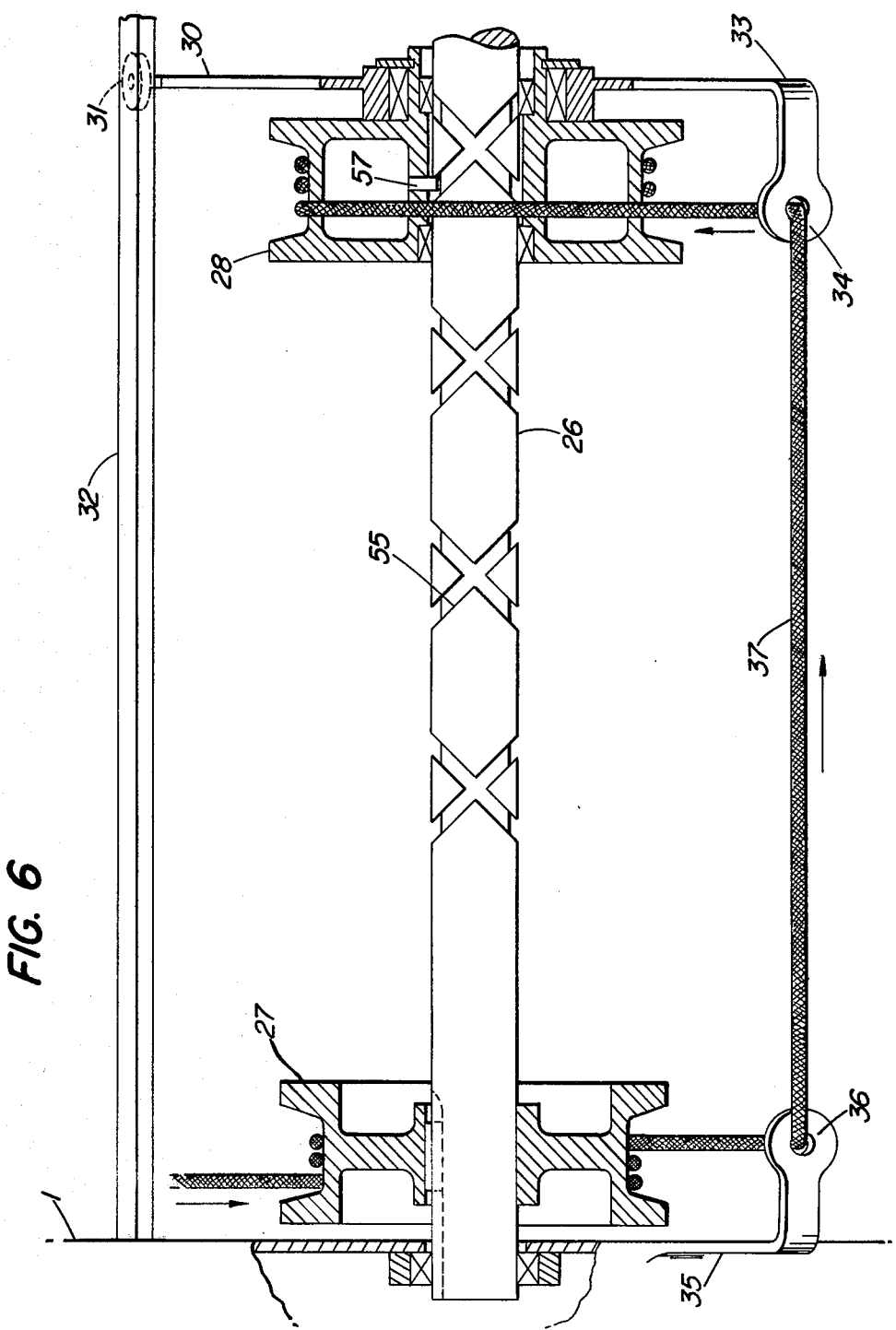
FIG. 6 is an enlarged fragmentary view of the tying device of FIG. 5 showing the internal arrangement of the pulleys of which the twine guide means is comprised.

A second embodiment of a tying device in accordance with this invention is shown in FIGS. 5 and 6. The embodiment of FIGS. 5 and 6 is identical to the embodiment of FIGS. 1 to 4 except the feature specifically identified below.

In this case, the rectilinear guide is constituted by a rotatable screw 26. Screw 26 has a double screw-thread 55 and is journalled in suitable bearings (not shown) provided on the baler. The twine guide means is comprised of a pair of pulleys 27, 28. Pulley 27 is nonrotatably keyed on one end of screw 26. Pulley 28 is an integral unit and is rotatably mounted on screw 26. A hub 29 of pulley 28 provided internally with a pin 57 or shaped parts which is engaged with the screw-threads 55 of the screw 26. Pulley 28 carries on a bearing a first arm 30 terminating in a roller 31 which is engaged in a guide channel 32 fixed on the baler parallel to the screw 26. Thus arm 30 is nonrotatable about screw 26 and together with pulley 28 is movable back and forth between each end of screw 26 when screw 26 is rotated. A second arm 33 extends forwardly from arm 30 and terminates in an eyelet 34. An arm 35 terminating in an eyelet 36 is fixed on a lateral wall of the baler in the vicinity of the twine box (not shown). The diameter of the second pulley 28 is greater than that of first pulley 27. The relative diameters are chosen such that a pulley 28 slowly traverses screw 26 during a tying operation.

Twine 37 issuing from the twine box first passes around the pulley 27, forming for example one turn, then passes through the eyelets 36 and 34 and forms at least one turn around the pulley 28. The free end of twine 37 is directed toward the entrance of the baler for the harvested products.

Conventional cut-off mechanisms 59, 61 for severing, retaining and releasing the twine at the end and beginning of a tying cycle may be provided for the embodiment of FIGS. 5, 6 identical to that provided for the embodiment of FIGS. 1 to 4 as explained above. Similarly, relative to the embodiment of FIGS. 1 to 4, pulley 28 is maintained at either one of two rest positions at respective ends of screw 26 between tying cycles.

The manner in which the tying device according to this embodiment functions is as follows:

Toward the end of the operation of forming the bale in the baler, one of the cut-off mechanisms 59, 61 which retains the free end of the twine is actuated to release twine 3 by an automatically or manually actuated means (not shown) of the type described in connection with the embodiment of FIGS. 1 to 4 herein. When twine 37 is thus free, its end is then engaged by the harvested products and by the bale and traction is applied thereto. Under the effect of this traction, twine 37 so pulled causes the pulley 28, pulley 27 and screw 26 to rotate in the same direction. Pulley 28 then undergoes a transverse displacement on the screw at a speed which is a function of the difference of the diameter between the two pulleys 27, 28. Thus, the slow speed transverse movement that is required to ensure a correct tying of the bale can be obtained.

When pulley 28 reaches the opposite end of the screw 26, arm 30 activates the adjacent one of the cut-off mechanisms 59, 61 which severs the twine and holds its free end. No traction continues to be exerted, screw 26 comes to rest and the pulley 28 remains in its new rest position until the next tying cycle.

Modifications may be made in the embodiments described, in the domain of technical equivalents, without deviating from the invention. Thus, one could, by providing a screw having screwthreads of different pitch, obtain displacements of the twine-guiding pulley on this screw at different speeds in the two directions.

We claim:

1. In a baler for forming cylindrical bales, said baler including a bale-forming chamber and a tying mechanism for tying a bale formed in said chamber, said mechanism comprising a rectilinear guide adjacent an entrance to the chamber, a supply of bale-tying twine and a twine guide means movable on said rectilinear guide, said twine engaged with said twine guide means intermediate said supply and said bale-forming chamber; wherein the improvement comprises said rectilinear guide is a threaded screw and said twine guide includes a pulley engaged with the threads of said screw and is displaceable on said screw responsive to the force exerted on the twine wrapped around a bale in said chamber when the bale in said chamber is rotated.

2. The improvement of claim 1 wherein said screw has a reversible screw thread.

3. The improvement of claims 1 or 2 wherein said screw is nonrotatable.

4. The improvement of claim 3 wherein said pulley comprises an outer rim, a hub and epicyclic gear train means interconnecting said outer rim and said hub.

5. The improvement of claim 4 wherein
    said hub of said pulley includes a rotatable hub section and a nonrotatable hub section,
    said epicyclic gear train means comprises a first and second sets of gear teeth formed on said rotatable and nonrotatable inner hubs, respectively, said sets of gear teeth having different diameters;
    said epicyclic gear train means comprises a pair of pinion gears rotatably mounted in said outer rim and a first and second of said pair of pinions are engaged with the first and second sets of gear teeth, respectively, said epicyclic gear train means producing a speed of transverse movement of said twine guide means along said screw less than the linear speed of the twine as the twine is wrapped around a bale in said chamber.

6. The improvement of claim 5 further comprising a stationary guide member disposed parallel to said screw and wherein said pulley further comprises an arm having a roller mounted thereon said roller is movably mounted relative in said stationary guide.

7. The improvement of claim 2 further comprises bearings mounted on the baler, said screw is journalled in said bearings, and wherein said twine guide means comprises a first pulley keyed to said screw at one end of said screw, and a second pulley having a hub in engagement with the threads of said screw, the tying twine path from said supply is first around the first pulley and then around the second pulley, said first and second pulley having different winding diameters.

8. The improvement of claim 7 wherein said second pulley includes a first, nonrotatable twine guide arm, said second pulley rotatably mounted to said first arm.

9. The improvement of claim 8 further comprising a stationary guide member disposed parallel to said screw, said second pulley comprises a second arm with a roller mounted thereon and movably mounted in said stationary guide, said first arm comprises an eyelet through which twine passes, said first and second arms are rigidly interconnected.

* * * * *